United States Patent
Ho et al.

(10) Patent No.: US 7,847,870 B2
(45) Date of Patent: Dec. 7, 2010

(54) PIXEL STRUCTURE WITH PIXEL ELECTRODE SHIELDING PATTERNED COMMON LINE HAVING FIRST AND SECOND SIDES FORMING AN INCLUDED ANGLE

(75) Inventors: Shiuan-Yi Ho, Hsinchu County (TW); Chien-Kuo He, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 192 days.

(21) Appl. No.: 12/191,300

(22) Filed: Aug. 13, 2008

(65) Prior Publication Data

US 2009/0323000 A1    Dec. 31, 2009

(30) Foreign Application Priority Data

Jun. 26, 2008    (TW) .............................. 97123974 A

(51) Int. Cl.
*G02F 1/1343* (2006.01)
(52) U.S. Cl. ....................................................... 349/38
(58) Field of Classification Search .................. 349/38, 349/141
See application file for complete search history.

(56) References Cited

U.S. PATENT DOCUMENTS

| 2005/0140897 A1* | 6/2005 | Kim ........................... 349/141 |
| 2007/0002245 A1* | 1/2007 | Lee et al. ..................... 349/141 |
| 2007/0040951 A1 | 2/2007 | Lee et al. |

FOREIGN PATENT DOCUMENTS

| JP | 2002296621 | 10/2002 |
| TW | I276868 | 3/2007 |

* cited by examiner

*Primary Examiner*—John Heyman
(74) *Attorney, Agent, or Firm*—Jianq Chyun IP Office

(57) ABSTRACT

A pixel structure including a substrate, a scan line, a patterned common line, an active device, a data line, a passivation layer, and a pixel electrode is provided. The scan line, the patterned common line, and the active device are disposed on the substrate. The active device has an insulation layer extending outward to cover the scan line and the patterned common line. Besides, the patterned common line has at least a first side and a second side. Extending directions of the first side and the second side together form a first included angle. The data line is disposed on the insulation layer, and the active device is electrically connected to the scan line and the data line. The passivation layer covers the active device. The pixel electrode is disposed on the passivation layer and electrically connected to the active device.

6 Claims, 5 Drawing Sheets

PIXEL STRUCTURE WITH PIXEL ELECTRODE SHIELDING PATTERNED COMMON LINE HAVING FIRST AND SECOND SIDES FORMING AN INCLUDED ANGLE

CROSS-REFERENCE TO RELATED APPLICATION

This application claims the priority benefit of Taiwan application serial no. 97123974, filed on Jun. 26, 2008. The entirety of the above-mentioned patent application is hereby incorporated by reference herein and made a part of specification.

BACKGROUND OF THE INVENTION

1. Field of the Invention

The present invention relates to a pixel structure, and more particularly to a design of a common line in a pixel structure.

2. Description of Related Art

Nowadays, multimedia technologies have been well developed, which mostly benefits from an advancement of semiconductor devices and display apparatuses. Among displays, thin film transistor liquid crystal displays (TFT-LCDs) characterized by high definition, high space effectiveness, low power consumption and no radiation have gradually become mainstream products in the display market. In general, the TFT-LCD mainly includes an active device array substrate, a color filter substrate, and a liquid crystal layer sandwiched between the two substrates. The active device array substrate has a plurality of pixel structures.

FIG. 1 is a top view of a conventional pixel structure. Referring to FIG. 1, a conventional pixel structure 100 includes a substrate 110, a scan line 120, a data line 130, a common line 140, a TFT 150, and a pixel electrode 160. The TFT 150 disposed on the substrate 110 can be electrically connected to the scan line 120 and the data line 130. Practically, the TFT 150 can be turned on by a switch signal transmitted through the scan line 120. After the TFT 150 is turned on, a display signal is transmitted to the pixel electrode 160 electrically connected to the TFT 150 through the data line 130.

Note that light leakage easily occurs in an area A near the common line 140 because of a defective rubbing process. In detail, a film layer covering the common line 140 is relatively protrusive due to the common line 140 disposed underneath, and an extending direction of the common line 140 is rather different from a rubbing direction R in an alignment process. Thus, the rubbing process performed on the area A along the rubbing direction R with use of bristles (not shown) for alignment is not prone to be carried out in an effective manner, such that the area A cannot be rubbed well. As such, there is a great need to resolve issues regarding light leakage and reduction of contrast occurring in the conventional pixel structure 100.

SUMMARY OF THE INVENTION

In light of the foregoing, the present invention is directed to a pixel structure which is capable of effectively reducing light leakage and increasing a contrast of the pixel structure.

The present invention provides a pixel structure including a substrate, a scan line, a patterned common line, an active device, a data line, a passivation layer, and a pixel electrode. The scan line, the patterned common line, and the active device are disposed on the substrate. The active device has an insulation layer extending outward to cover the scan line and the patterned common line. Besides, the patterned common line has at least a first side and a second side. An extending direction of the first side and an extending direction of the second side together form a first included angle. On the other hand, the data line is disposed on the insulation layer, and the active device is electrically connected to the scan line and the data line. The passivation layer of the present invention covers the active device. The pixel electrode is disposed on the passivation layer and electrically connected to the active device.

In one embodiment of the present invention, the first included angle ranges from 15 degrees to 60 degrees.

In one embodiment of the present invention, the patterned common line further includes two branch lines that are respectively connected with two ends of the patterned common line to present an H shape.

In one embodiment of the present invention, the patterned common line further includes a branch line. An end of the branch line is connected with an end of the patterned common line to present an inverted L shape.

In one embodiment of the present invention, the scan line has a third side and a fourth side, and an extending direction of the third side and an extending direction of the fourth side together form a second included angle.

In one embodiment of the present invention, the second included angle in the pixel structure ranges from 15 degrees to 60 degrees.

In the present invention, the extending directions of the first side and the second side of the patterned common line together form the first included angle. By adjusting the first included angle, the difference between the extending direction of the patterned common line and the rubbing direction can be reduced, so as to prevent poor alignment. In addition, the third side and the fourth side of the scan line together form the second included angle, such that the poor alignment can be avoided to a better extent. As such, the pixel structure of the present invention is able to effectively prevent the light leakage caused by the poor alignment, and the contrast of the pixel structure can be enhanced.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
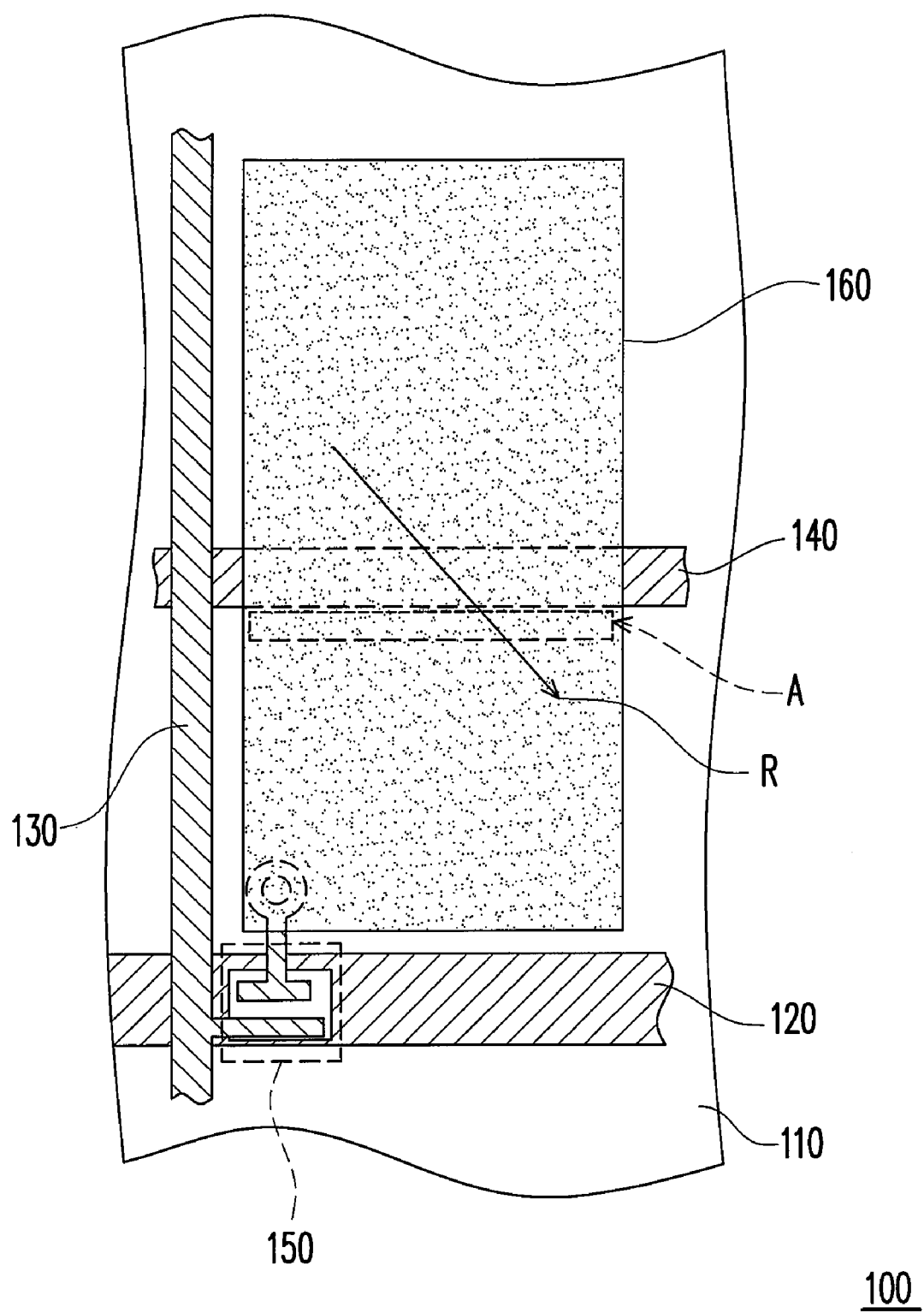
FIG. 1 is a top view of a conventional pixel structure.
Figure 2A:
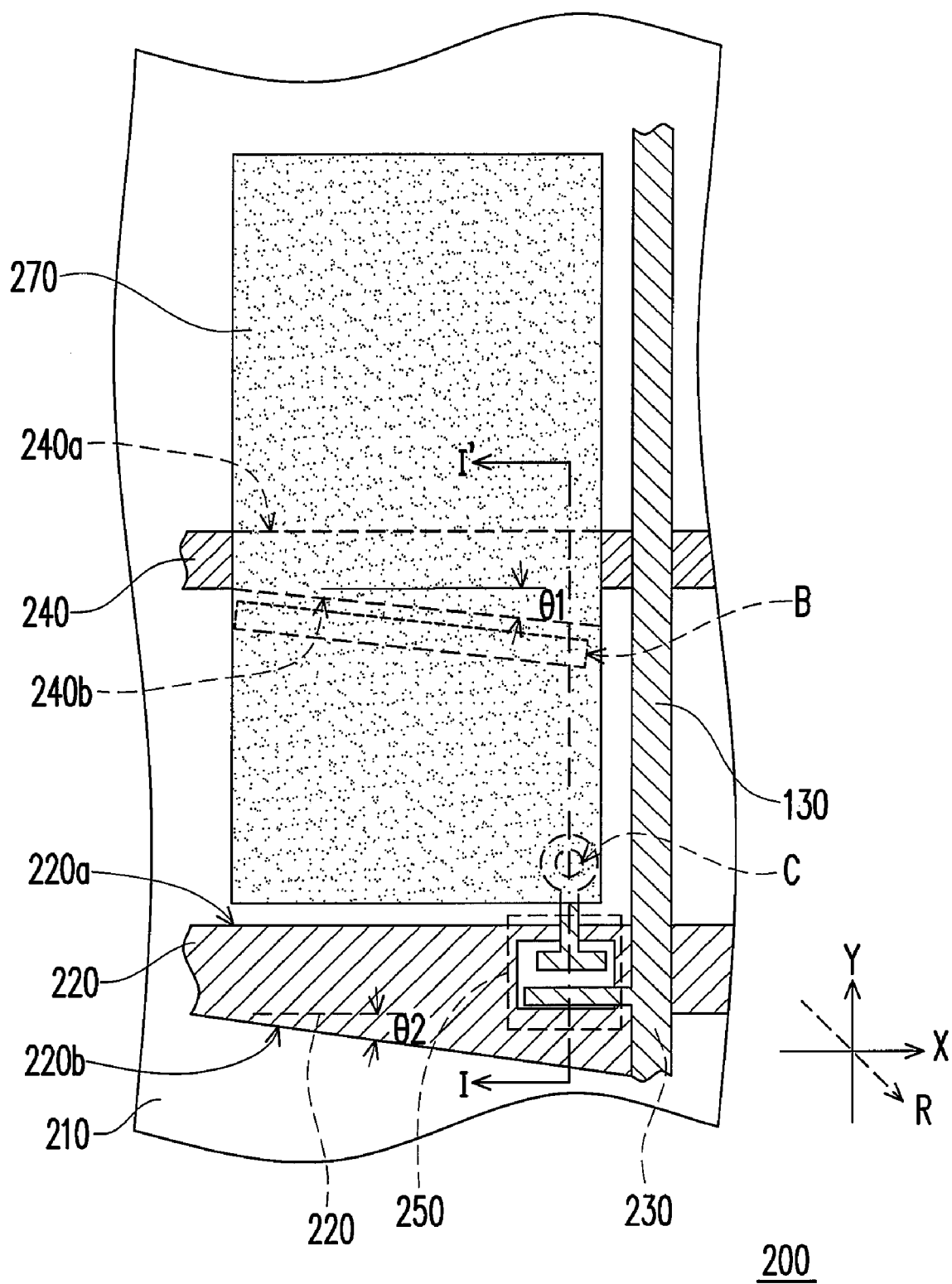
FIG. 2A is a schematic view of a pixel structure according to a first embodiment of the present invention.
Figure 2B:
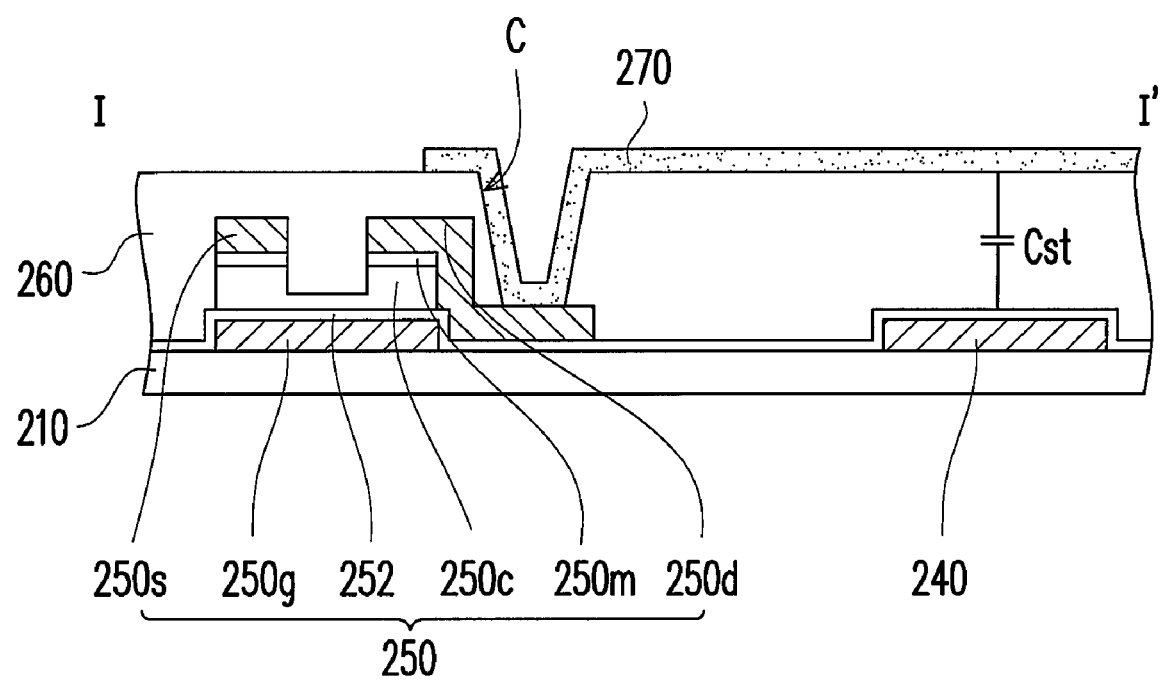
FIG. 2B is a schematic cross-sectional view taken along a sectional line I-I' depicted in FIG. 2A.

FIG. 2A is a schematic view of a pixel structure according to a first embodiment of the present invention. FIG. 2B is a schematic cross-sectional view taken along a sectional line I-I' depicted in FIG. 2A. For the purpose of better illustration and comprehension, a passivation layer and an insulation layer are not illustrated in FIG. 2A but in FIG. 2B. Referring to FIGS. 2A and 2B, a pixel structure 200 of the present invention includes a substrate 210, a scan line 220, a data line 230, a patterned common line 240, an active device 250, a passivation layer 260, and a pixel electrode 270. Specifically, the active device 250 indicated in FIG. 2B can include a gate 250g, an insulation layer 252, a channel layer 250c, an ohmic contact layer 250m, a source 250s, and a drain 250d. The gate 250g is disposed on the substrate 210 and can constitute a part of the scan line 220 shown in FIG. 2A. It is of certainty that people skilled in the pertinent art should be aware that the gate 250g may be an outward protrusion of the scan line 220, and the aforementioned only serves as an example and is not intended to limit the present invention.

In addition, the insulation layer 252 not only covers the gate 250g but also covers the scan line 220 and the patterned common line 240 disposed on the substrate 210 as shown in FIG. 2A. To reduce contact resistance between metallic materials and semiconductor materials, the ohmic contact layer 250m is disposed between the source 250s and the channel layer 250c, and between the drain 250d and the channel layer 250c. Note that the active device 250 illustrated in FIG. 2B is a TFT having a bottom gate structure. Alternatively, the active device 250 can also be a bipolar junction transistor or any other active devices with three terminals, which is not limited in the present invention.

Besides, the passivation layer 260 covers the active device 250. Here, the passivation layer 260 has a contact window C. A pixel electrode 270 disposed on the passivation layer 260 can be electrically connected to the drain 250d of the active device 250 through the contact window C. Note that the patterned common line 240, the pixel electrode 270, and film layers sandwiched therebetween can together constitute a storage capacitor Cst. Practically, the active device 250 can be turned on by a switch signal transmitted through the scan line 220. After the active device 250 is turned on, a display signal is transmitted to the pixel electrode 270 through the data line 230, the source 250s, and the drain 250d in sequence. Besides, normal display functions of the pixel structure 200 can be maintained with the assistance of the storage capacitor Cst.

It should be mentioned that the patterned common line 240 indicated in FIG. 2A at least has a first side 240a and a second side 240b. Extending directions of the first side 240a and the second side 240b together form a first included angle θ1. In one embodiment of the present invention, the first included angle θ1 ranges from 15 degrees to 60 degrees. By adjusting the first included angle θ1, the difference between the extending direction of the second side 240b and a rubbing direction R can be reduced effectively, such that bristles (not shown) for alignment can be used for an effective implementation of an alignment process on an area B. As a result, occurrence of light leakage caused by poor alignment in the area B near the patterned common line 240 can be prevented, and a contrast of the pixel structure 200 can be enhanced. In one embodiment of the present invention, the extending direction of the second side 240b can also be completely consistent with the rubbing direction R by adjusting the first included angle θ1. To further resolve the issue regarding the poor alignment, the scan line 220 of the present invention has a third side 220a and a fourth side 220b. Extending directions of the third side 220a and the fourth side 220b together form a second included angle θ2. In one embodiment of the present invention, the second included angle θ2 ranges from 15 degrees to 60 degrees.

Given that an aperture ratio remains unchanged, an area occupied by the patterned common line 240 can be appropriately expanded by increasing the first included angle θ1 between the first side 240a and the second side 240b, while an area occupied by the scan line 220 is correspondingly reduced. As such, storage capacitance as provided in FIG. 2B can be increased in an effective manner, and so can the display quality of the pixel structure 200 of the present invention be increased.

Second Embodiment

Figure 3:
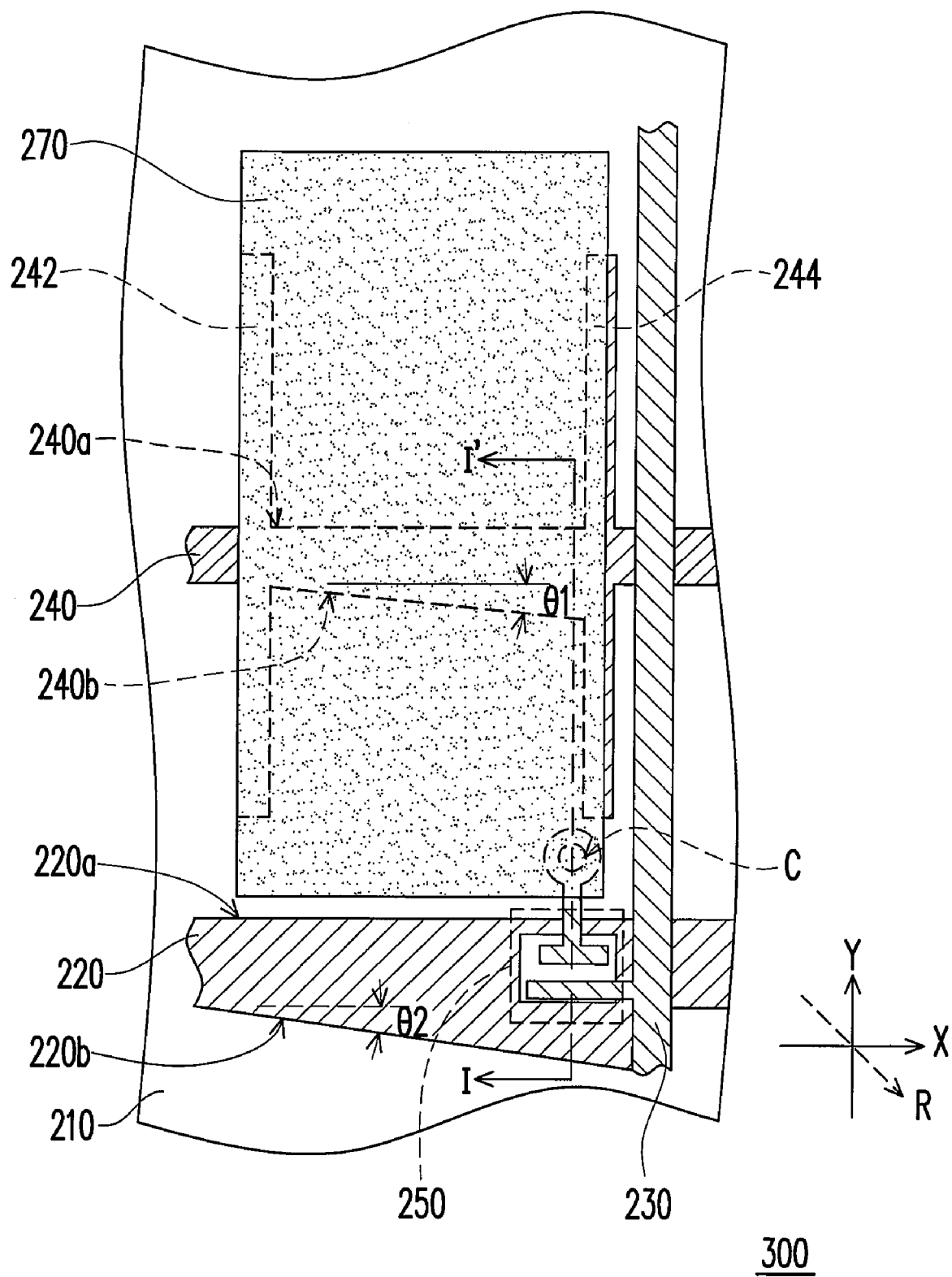
FIG. 3 is a schematic view of a pixel structure according to a second embodiment of the present invention.

The second embodiment is similar to the first embodiment, and therefore the similarities of these two embodiments are not described herein. The difference between the first embodiment and the second embodiment mainly lies in a layout of the patterned common line. FIG. 3 is a schematic view of a pixel structure according to the second embodiment of the present invention. Referring to FIG. 3, the patterned common line 240 in a pixel structure 300 of the present embodiment further includes two branch lines 242 and 244. The two branch lines 242 and 244 are respectively connected with two ends of the patterned common line 240 to present an H shape, such that the storage capacitance of the pixel structure 300 can be effectively improved.

Third Embodiment

Figure 4:
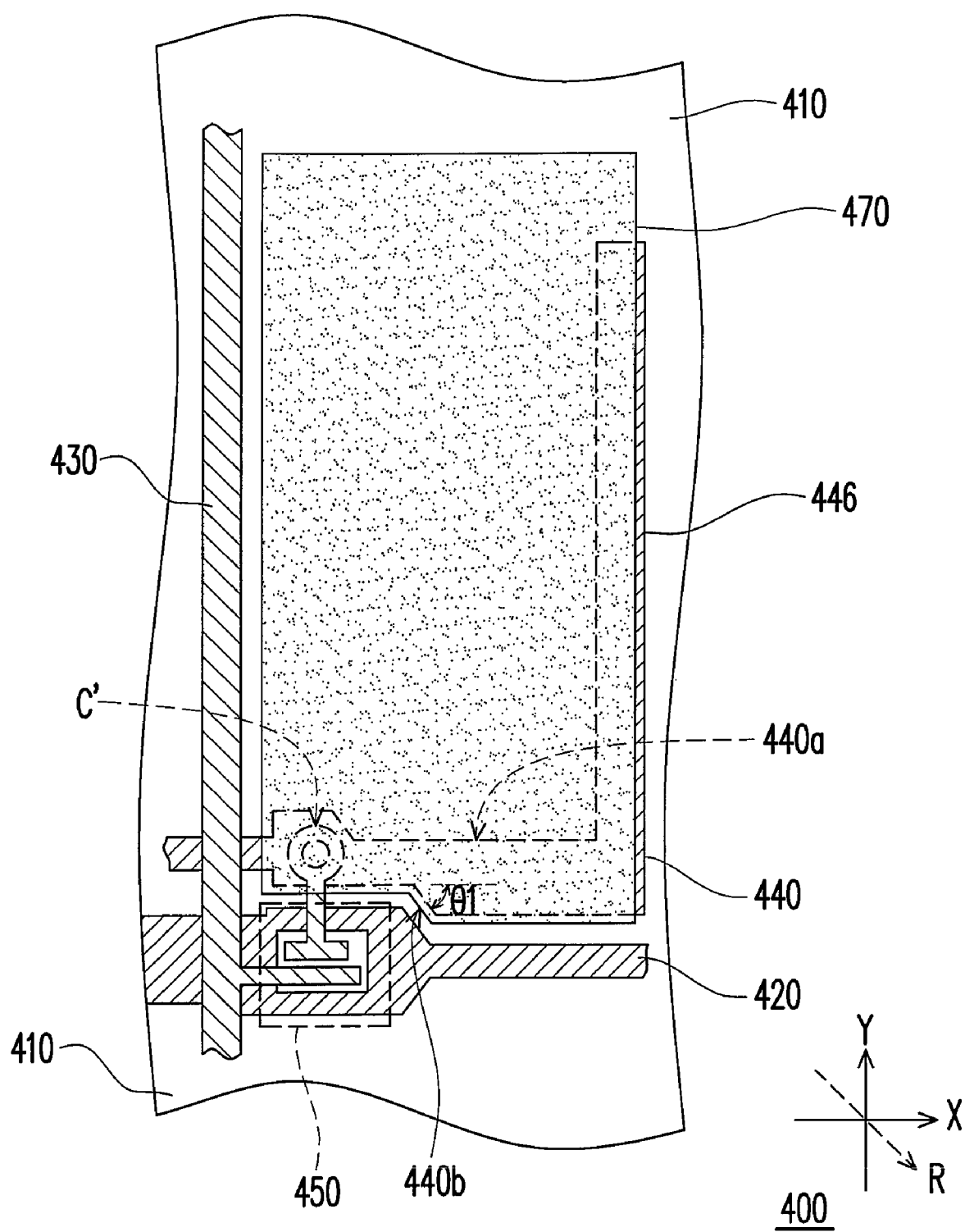
FIG. 4 is a schematic view of the pixel structure according to a third embodiment of the present invention.

FIG. 4 is a schematic view of a pixel structure according to a third embodiment of the present invention. Referring to FIG. 4, a pixel structure 400 of the present embodiment includes at least a substrate 410, a scan line 420, a data line 430, a patterned common line 440, an active device 450, and a pixel electrode 470. The scan line 420 and the data line 430 are electrically connected to the active device 450 disposed on the substrate 410, and the active device 450 is electrically connected to the pixel electrode 270 through a contact window C'.

Note that a layout of the patterned common line 440 can also be the layout as shown in FIG. 4. The patterned common line 440 has at least a first side 440a and a second side 440b, and extending directions of the first side 440a and the second side 440b together form a first included angle θ1. In one embodiment of the present invention, the first included angle θ1 ranges from 15 degrees to 60 degrees. By adjusting the first included angle θ1, the difference between the extending direction of the second side 440b and the rubbing direction R can be effectively reduced, so as to resolve the issue regarding the poor alignment. In addition, the patterned common line 440 can further include a branch line 446. An end of the branch line 446 is connected with an end of the patterned common line 440 to present an inverted L shape. This is also conducive to an increase in the storage capacitance of the pixel structure 400.

Based on the above, the extending directions of the first side and the second side of the patterned common line in the present invention together form the first included angle. By adjusting the first included angle, the difference between the extending direction of the patterned common line and the rubbing direction can be reduced, so as to prevent the poor alignment. In addition, the third side and the fourth side of the scan line can together form the second included angle, and thereby the poor alignment can be avoided to a better extent. As such, the pixel structure of the present invention is able to effectively prevent the light leakage caused by the poor alignment, and the contrast of the pixel structure can be further enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:

a substrate;

a scan line, disposed on the substrate;

a patterned common line, disposed on the substrate and having at least a first side and a second side opposite to each other, wherein an extending direction of the first side and an extending direction of the second side together form a first included angle;

an active device, disposed on the substrate and having an insulation layer that extends outward to cover the scan line and the patterned common line;

a data line, disposed on the insulation layer, wherein the active device is electrically connected to the scan line and the data line;

a passivation layer, covering the active device; and a pixel electrode, disposed on the passivation layer and electrically connected to the active device, wherein the pixel electrode is disposed across the patterned common line and shields the first side and the second side of the patterned common line.

2. The pixel structure as claimed in claim 1, wherein the first included angle ranges from 15 degrees to 60 degrees.

3. The pixel structure as claimed in claim 1, wherein the patterned common line further comprises two branch lines that are respectively connected with two ends of the patterned common line to present an H shape.

4. The pixel structure as claimed in claim 1, wherein the patterned common line further comprises a branch line, and an end of the branch line is connected with an end of the patterned common line to present an inverted L shape.

5. The pixel structure as claimed in claim 1, wherein the scan line has a third side and a fourth side, and an extending direction of the third side and an extending direction of the fourth side together form a second included angle.

6. The pixel structure as claimed in claim 5, wherein the second included angle ranges from 15 degrees to 60 degrees.

* * * * *